United States Patent [19]

Ohe

[11] Patent Number: 4,729,067
[45] Date of Patent: Mar. 1, 1988

[54] LIGHT DIFFUSING DEVICE
[75] Inventor: Makoto Ohe, Tokyo, Japan
[73] Assignee: Mitsubishi Rayon Company Ltd., Tokyo, Japan
[21] Appl. No.: 912,005
[22] Filed: Sep. 26, 1986
[51] Int. Cl.$^4$ ............................................. H02B 1/08
[52] U.S. Cl. ........................................ 362/26; 362/31; 362/307; 362/97; 40/448; 350/321
[58] Field of Search ............... 362/31, 26, 97, 337, 362/307, 32; 40/546, 547, 448; 350/321, 345, 381

[56] References Cited

U.S. PATENT DOCUMENTS 3,546,438 12/1970 Buc .................................. 362/31
3,752,974 8/1973 Baker et al. ........................ 362/31
4,642,736 2/1987 Masuzawa et al. ................. 362/31

Primary Examiner—James C. Yeung
Attorney, Agent, or Firm—Oblon, Fisher, Spivak, McClelland & Maier

[57] ABSTRACT

A light diffusing device useful for evenly illuminating a relatively large area comprises; (A) a base plate comprising a transparent light transmitting layer, an intermediate layer and a light diffusing layer arranged in the above mentioned order, and having at least one light, incident edge face thereof; (B) a light reflecting surface layer formed on a surface of the transparent light transmitting layer opposite to the light diffusing layer; and (C) a light diffusing plate arranged on and in the vicinity of the light diffusing layer but not in contact with the light diffusing layer.

5 Claims, 4 Drawing Figures

LIGHT DIFFUSING DEVICE

BACKGROUND OF THE INVENTION

1. Field of the Invention

The present invention relates to a light diffusing device. Particularly, the present invention relates to an improved light diffusing device useful for evenly illuminating a relatively large area at a significantly reduced optical loss.

2. Description of the Related Art

Various known light diffusing devices are useful as a plane light source for transmitting light received from a light source to a desired object to evenly illuminate a relatively large area. These light diffusing devices are practically employed as an illumination means for display devices, for example, advertising display devices, and further, as rear face illumination means for liquid crystal display devices.

Also various known light diffusing plates, for example, frosted glass plates and milk (opal) white glass plates, are used for the purpose of light diffusion. The light diffusing plates are usually utilized in such a manner that a light source is located by and spaced from a rear surface of the light diffusing plate at a predetermined distance.

In recent types of liquid crystal display devices, however, it has been attempted to arrange the light source in the vicinity of an edge face of a light diffusing plate which has been utilized as a light incident face, to minimize the size of the display devices. In this attempt, it has been found that, where the light source is merely arranged at the edge face of the usual light diffusing plate, for example, a frosted glass plate or milk white glass plate, it fails to evenly illuminate the entire surface of the light diffusing plate.

To eliminate the above-mentioned disadvantage, U.S. Pat. No. 4,059,916 discloses a concept wherein a rear surface of a light transmitting plate is matted (roughed) in a hairline mode and a light reflecting layer is formed on the mat rear surface so that light irradiated from a light source can be transmitted through the light transmitting plate in an enhanced directivity, and the thickness of the light transmitting plate is gradually decreased from the edge face facing the light source toward the opposite edge face of the plate, so that the brightness at the opposite edge face of the plate is increased and thus, the brightness throughout the entire surface of the plate becomes uniform.

The above-mentioned type of light diffusing plate is, however, disadvantageous in that the production of the light diffusing plate can be attained only by very fine, delicate and precise work on a surface of a transparent light transmitting plate, and this work causes an extreme increase in the production cost. This is disadvantageous since, from a commercial viewpoint, the cost for producing the light diffusing plate must be reduced. Therefore, it is clear that the above-mentioned type of light diffusing plate is still unsatisfactory in view of the cost thereof.

To remove the above-mentioned disadvantage, Japanese Unexamined Patent Publication (Kokai) No. 61-55684 discloses an improved type of light diffusing device comprising a base plate composed essentially of a transparent light transmitting layer corresponding to a substantially major portion of the base plate, a light diffusing layer formed on at least a front surface of the transparent light transmitting layer and an intermediate layer formed between the transparent light transmitting layer and the light diffusing layer and having intermediate light transmitting and diffusing properties between those of the light transmitting and diffusing layers, at least one edge face of the base plate being a light incident face; and a light reflecting face layer formed on the rear surface of the base plate.

The above-mentioned light diffusing device is significantly advantageous in cost for producing the device.

However, in view of the recent demand for a display on a large screen having a size of 10 to 14 inches, there is an increased demand for the provision of an even further increased uniformity (evenness) in brightness over the entire surface of such a large screen.

SUMMARY OF THE INVENTION

An object of the present invention is to provide a light diffusing device useful for illuminating a relatively large display surface with a uniform brightness.

Another object of the present invention is to provide a light diffusing device having a significantly decreased optical loss.

Still another object of the present invention is to provide a light diffusing device capable of being produced easily and at a low cost.

The above-mentioned objects can be attained by the light diffusing device of the present invention which comprises; (A) a base plate comprising (a) a transparent light transmitting layer, (b) a light diffusing layer formed on a front surface of the transparent light transmitting layer, and (c) an intermediate layer formed between the transparent light transmitting layer and a light diffusing layer and having a light transmitting property and a light diffusing property respectively in intermediate intensities between those of the transparent light transmitting layer and the light diffusing layer, which base plate has at least one light incident edge face thereof; (B) a light reflecting surface layer formed on a rear surface (opposite to the front surface) of the transparent light transmitting layer; and (C) a light diffusing plate arranged on and in the vicinity of the light diffusing layer but not in contact with the light diffusing layer. At least one light reflecting edge face layer is preferably formed on an edge face other than the at least one light incident edge face of the transparent light transmitting layer.

DESCRIPTION OF THE PREFERRED EMBODIMENTS

Figure 1:
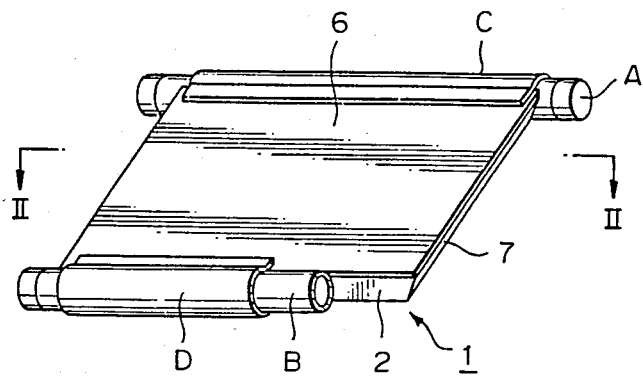
FIG. 1 is a partially notched perspective view of an embodiment of the light diffusing device of the present invention while in use.

The light diffusing device of the present invention will be explained by referring to the drawings.

Figure 2:
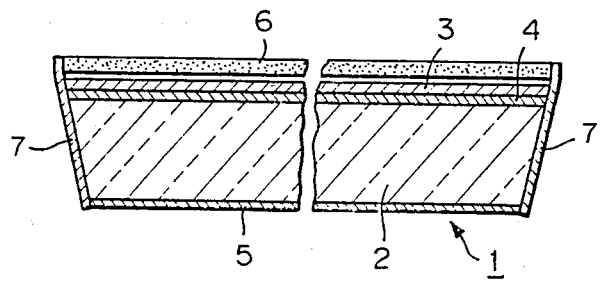
FIG. 2 is a partially notched cross-sectional view of the device indicated in FIG. 1 along the line II—II therein.
Figure 3:
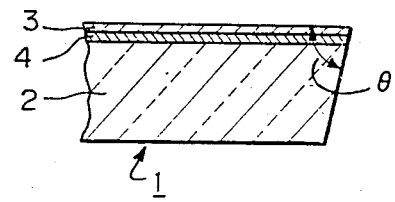
FIG. 3 is a cross-sectional view of a portion of a base plate in the light diffusing device of the present invention.

Referring to FIGS. 1, 2 and 3, a base plate 1 comprises a transparent light transmitting layer 2 which usually occupies a major volume in the base plate 1, a light diffusing layer 3 arranged on a front surface (an upper surface in FIG. 2) of the transparent light transmitting layer 2, and an intermediate layer 4 formed between the transparent light transmitting layer 2 and the light diffusing layer 3. The intermediate layer 4 has a light transmitting property and a light diffusing property having intermediate intensities between those of the transparent light transmitting layer 2 and the light diffusing layer 3.

A light reflecting surface layer 5 is arranged on a rear face (a lower face in FIG. 2) of the base plate 1. Also, a conventional light diffusing plate 6 is arranged above the front surface of the base plate 1 in such a manner that the light diffusing plate 6 is neither adhered to nor pressed onto the base plate 1. That is, the light diffusing plate 6 is not forced into close contact with the base plate 1. Accordingly, the light diffusing plate 6 is spaced from the base plate 1 by a very thin gap which forms a very thin air layer. In FIG. 2, the gap between the light diffusing layer 3 and the light diffusing plate 6 is shown on an enlarged scale, to give a clear indication of the arrangement of the light diffusing layer 3 and the light diffusing plate 6.

In the embodiment of the light diffusing device indicated in FIG. 1, the base plate 1 and the light diffusing plate 6 have rectangular plane configurations similar in shape and dimensions to each other.

The base plate has at least one light incident edge face thereof. Referring to FIG. 1, the base plate 1 has a pair of light incident edge faces facing and exposed to light sources (for instance, fluorescent lamps) A and B which are provided with reflectors C and D, respectively. Also, the base plate 1 has other edge faces thereof than the at least one light incident edge face, the other edge faces preferably being formed as slanted or inclined faces and being at an acute angle $\theta$ to a front face of the base plate 1, as shown in FIGS. 2 and 3.

The edge faces other than the at least one light incident face of the base plate 1 and the edge faces of the light diffusing plate 6 are preferably provided with light reflecting edge face layers 7 as shown in FIG. 2.

In the embodiment of the light diffusing device shown in FIG. 1, the base plate 1 has two light incident edge faces thereof facing and exposed to two light sources A and B. However, the light diffusing device of the present invention may have another type of base plate which has, for example, only one light incident edge face thereof exposed to a single light source.

In the light diffusing device of the present invention, the transparent lighttransmitting layer usually consists of a highly transparent plastic material, for example, an alkyl methacrylate polymer sheet, especially a methyl methacrylate polymer sheet preferably having a thickness of from 0.3 mm to 20 mm, more preferably from 3.0 to 15 mm.

The light diffusing layer usually consists of a matrix consisting of an alkyl methacrylate polymer produced by a multi-stage polymerization method and a light diffusing agent, for example, titanium dioxide fine powder, dispersed in the matrix. This type of alkyl methacrylate polymer is disclosed in U.S. Pat. Nos. 3,804,925, 4,052,523, 4,173,600 and 4,508,875. Usually, the light diffusing layer has a thickness of from 0.05 to 1 mm.

The base plate of the present invention can be produced by any known methods.

For example, a front surface of a methyl methacrylate polymer plate (film) is coated with a mixture of a methacrylic monomeric liquid and a light diffusing agent so as to cause the front surface of the methyl methacrylate polymer plate to be dissolved or swollen by the monomeric liquid and to allow the light diffusing agent to diffuse into the dissolved or swollen front surface of the methyl methacrylate polymer plate. Then, the methacrylic monomeric liquid is polymerized to provide a light diffusing layer and an intermediate layer.

Alternatively, a thin light diffusing film consisting of an alkyl methacrylate polymer containing a light diffusing agent dispersed therein is brought into contact with a layer consisting of an alkyl methacrylate monomer or syrup to cause a surface of the light diffusing film to be dissolved or swollen by the monomer or syrup and to allow the monomer or syrup to diffuse into the dissolved or swollen surface of the light diffusing film. Then, the monomer or syrup is polymerized, preferably under heat and pressure, to provide a transparent light transmitting layer and an intermediate layer which bonds the transparent light transmitting layer to the light diffusing film layer to form a body of a base plate, the above-mentioned method is disclosed in U.S. Pat. No. 4,415,509.

In another method for producing the base plate, surface portions of a light-diffusing film consisting of an acrylic polymer matrix and a light diffusing agent dispersed in the matrix, and of a transparent light transmitting plate consisting of a transparent methacrylic polymer, are partially dissolved or swollen and the partially dissolved or swollen surfaces are brought into contact so as to allow the partially dissolved or swollen surface portions of the light diffusing film and transparent light transmitting plate to diffuse into each other and to form an intermediate layer between the light transmitting layer and the light diffusing layer.

Usually, the intermediate layer has a thickness of from 0.01 mm to 0.2 mm.

The intermediate layer is highly effective for firmly bonding the transparent light transmitting layer to the light diffusing layer and for enhancing the diffusion of light transmitted through the transparent light transmitting layer into the light diffusing layer.

The base plate usually has a flat plate-like shape and a rectangular plane configuration as shown in FIGS. 1 and 2. However, the shape and configuration of the base plate are not restricted to those mentioned above, and may be other than those shown. Also, the base plate shown in FIGS. 1 and 2 has a uniform thickness throughout the entire body of the base plate. However, the thickness of the base plate may be variable depending on the distance from each light incident edge face of the base plate. For example, the thickness may be gradually decreased from each light incident edge face facing a light source toward the center of the base plate. That is, the dimensions and shape of the base plate can be varied depending upon the intended use of the light diffusing device.

Referring to FIG. 2, the light reflecting layer 5 can be formed, for example, by vapor depositing or plating a metal, for example, aluminum, on the rear surface of the base plate 1. Alternatively, the light reflecting surface layer 5 is formed by adhering a light reflecting tape having a metal surface layer provided by means of a vapor deposition of a metal, for example, aluminum on a surface of a plastic tape, to the rear surface of the base plate 1. The thickness of the light reflecting surface layer 5 is not restricted to a specific value as long as it can satisfactorily serve as a light reflector.

The light diffusing plate 6 as indicated in FIGS. 1 and 2 may consist of a conventional light diffusing plate, for example, frosted glass plate, milk white glass plate or a thermoplastic plate containing a light diffusing agent dispersed therein. Usually, the thickness of the light diffusing plate 6 is ¼ that of the base plate 1 or less.

Referring to FIGS. 1 and 2, the light reflecting edge face layers 7 is provided with an irregular reflection surface having a high reflectance. Usually, the light reflecting edge face layers 7 are made of a retroreflection tape.

As described above, the light reflecting edge face layers 7 are preferably slanted or inclined at an acute angle $\theta$ to the front surface of the base plate. The angle $\theta$ is preferably in the range of from 75 to 88 degrees. The slanted light reflecting edge face layers 7 are effective for irradiating the light reflected by the reflecting edge face layer to a light diffusing layer at a location far from the light source to obtain an increased uniform brightness.

Referring to FIGS. 1 and 2, when the light sources (fluorescent lamps) A and B are lit, the irradiated light is introduced into the transparent light transmitting layer 2 through the edge faces thereof facing the light sources. The introduced light, portions of which are reflected by the light reflecting surface layer 5 and by the light reflecting edge face layers 7 and returned into the transparent light transmitting layer 2, are transmitted to the light diffusing layer 3 through the intermediate layer 4. The light is evenly diffused by the intermediate layer and the light diffusing layer 3. The diffused light is introduced into the light diffusing plate 6 through an air layer formed between the base plate 1 and the light diffusing plate 6.

The introduced light is evenly diffused in the light diffusing plate 6 and irradiated to the outside of the device.

The light diffusing device of the present invention provides a highly uniform illumination with evenly scattered light at a reduced optical loss. That is, the light diffusing device of the present invention is extremely useful for a large size display system.

The present invention will be more fully explained by means of examples, but it should be understood that these are merely representative and do not restrict the scope of the present invention in any way.

EXAMPLE 1

(1) Production of Base Plate

A rutile type titanium oxide in an amount of 1.5% by weight was dry blended with 98.5% by weight of acrylic resin pellets consisting of a methylmethacrylatebutylacrylate copolymer ("Hipet", registered trade mark, made by Mitsubishi Rayon Co.). The blend was subjected to an ordinary process for producing an acrylic resin film having a thickness of 50 μm.

The film was spread on an inorganic glass plate and temporarily adhered thereto with a methyl methacrylate adhesive. Spacers were placed on edge portions of the film and another glass plate was placed on the spacers to produce a cell formed by the two glass plates facing each other through the spacers. The film is located within the resultant cell.

A syrup consisting of partially polymerized methyl methacrylate was poured into the gap having a thickness of about 10 mm and formed between the two glass plates, and was completely polymerized.

When the syrup was brought into contact with the titanium dioxide-containing acrylic resin film, a surface of the film was partially dissolved or swollen to allow the syrup to diffuse into the surface of the film and to form an intermediate layer. The resultant acrylic resin transparent plate had a thickness of about 10 mm and was provided with the titanium dioxide-containing acrylic resin film bonded to a front surface of the transparent plate through the intermediate layer.

A light reflecting layer was formed in a thickness of about 1000 Å by means of a vacuum vapor deposition of aluminum on a rear surface (opposite to the front surface) of the acrylic resin plate.

The resultant plate was cut into a rectangular piece having a length of 200 mm and a width of 180 mm. That is, the piece had a pair of longitudinal edge faces and a pair of transverse edge faces. The two longitudinal edge faces were flame polished, and the two transverse edge faces were cut to form slanted edge faces inclined at an angle $\theta$ of about 82 degrees to the front surface of the piece. Thus, a base plate provided with the light reflecting surface layer formed on the rear surface of the base plate was obtained.

(2) Assembling of Light Diffusing Device

A light diffusing milk white plate consisting of an acrylic resin ("Acrylite", registered trade mark, manufactured by Mitsubishi Rayon Co.) was cut into a rectangular plate piece having a length of 200 mm and a width of 180 mm. The rectangular milk white plate had a pair of slanted transverse edge faces having a length of 180 mm inclined at an angle of about 82 degrees to a front surface of the milk white plate.

The light diffusing plate consisting of the rectangular milk white plate was placed on the front surface of the base plate in the vicinity of each other in such a manner that a milk white surface of the light diffusing plate faces the front surface of the base plate without being in direct contact with each other.

The rectangular light diffusing plate and the base plate were integrated into one body by applying a double surface adhesive tape to the transverse edge faces of the rectangular light diffusing plate and base plate.

A recurring reflection sheet ("Sparklite", registered trade mark, made by Unichika Co.) having a vapor deposited aluminum layer was applied to the double surface adhesive tape layer on the integrated structure in such a manner that a surface of the vapor deposited aluminum layer came into contact with the adhesive tape. Thus, a light diffusing device was obtained.

(3) Combining of Light Sources

Two fluorescent lamps (FL-6W, produced by Toshiba Ltd.) having a diameter of 15 mm, a length of 210 mm and an output of 6 W were arranged in the vicinity of the longitudinal edge faces of the light diffusing device. The outer surface of the fluorescent lamps were covered by reflectors consisting of aluminum plate, except for portions of the outer surfaces facing the longitudinal edge faces.

The resultant device had the construction as shown in FIGS. 1 and 2.

Figure 4:
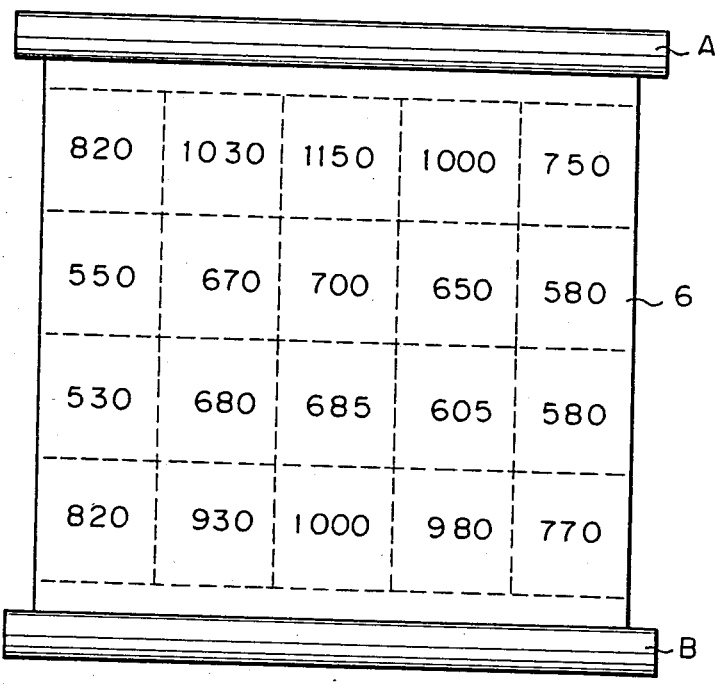
FIG. 4 shows a distribution of brightness on the light diffusing plate in the light diffusing device in Example 1

When the fluorescent lamps were lit, and light diffusion on the light diffusing plate in the light diffusing device was observed by the naked eye, it was found that the light was evenly diffused and irradiated. The brightness on the light diffusing plate was measured in the following manner. That is, the front surface of the light diffusing device was partitioned into 20 sections as shown in FIG. 4.

The brightnesses in cd/m² at the center points of the sections were measured by means of a brightness meter (nt 1 degree made by MINOLTA CO.). The results are shown in FIG. 4. An average value of the measured 20 brightnesses was 735 cd/m².

I claim:
1. A light diffusing device comprising:
    (A) a base plate comprising (a) a transparent light transmitting layer, (b) a light diffusing layer formed on a front surface of the transparent light transmitting layer, and (c) an intermediate layer formed between the transparent light transmitting layer and the light diffusing layer and having a light transmitting property and a light diffusing property respectively at intermediate intensities between those of the transparent light transmitting layer and the light diffusing layer, which base plate has at least one light incident edge face thereof;
    (B) a light reflecting surface layer formed on a rear surface of the transparent light transmitting layer; and
    (C) a light diffusing plate arranged on and in the vicinity of the light diffusing layer but not in contact with the light diffusing layer.

2. The light diffusing device as claimed in claim 1, wherein light reflecting edge face layers are formed on edge faces other than the at least one light incident edge face of the transparent light transmitting layer.

3. The light diffusing device as claimed in claim 2, wherein the edge faces other than the at least one light incident edge face are at an acute angle $\theta$ to a front surface of the base plate.

4. The light diffusing device as claimed in claim 1, wherein the transparent light transmitting layer predominates in volume at the base plate.

5. The light diffusing device as claimed in claim 1, wherein light reflecting edge face layers are formed on edge faces of the light diffusing plate.

* * * * *